(12) United States Patent
Petersen

(10) Patent No.: US 9,995,901 B2
(45) Date of Patent: Jun. 12, 2018

(54) ADJUSTMENT DIAL ASSEMBLIES FOR SEALED SYSTEMS

(71) Applicant: N2 Imaging Systems, LLC, Irving, CA (US)

(72) Inventor: Greg Petersen, Newport Beach, CA (US)

(73) Assignee: N2 Imaging Systems, LLC, Irving, CA (US)

( * ) Notice: Subject to any disclaimer, the term of this patent is extended or adjusted under 35 U.S.C. 154(b) by 231 days.

(21) Appl. No.: 15/140,829

(22) Filed: Apr. 28, 2016

(65) Prior Publication Data

US 2017/0315323 A1    Nov. 2, 2017

(51) Int. Cl.
*F41G 1/38* (2006.01)
*G02B 7/02* (2006.01)
*G02B 7/00* (2006.01)

(52) U.S. Cl.
CPC ............... *G02B 7/023* (2013.01); *F41G 1/38* (2013.01); *G02B 7/004* (2013.01)

(58) Field of Classification Search
CPC ............ G02B 7/023; G02B 7/004; F41G 1/38
USPC ..................................... 33/297, 298
See application file for complete search history.

(56) References Cited

U.S. PATENT DOCUMENTS

| | | | | |
|---|---|---|---|---|
| 2,627,659 A | * | 2/1953 | Murr | F41G 1/38 33/298 |
| 3,419,334 A | * | 12/1968 | Hubbard | F41G 1/38 33/265 |
| 4,584,776 A | * | 4/1986 | Shepherd | G02B 23/10 33/298 |
| 5,513,440 A | * | 5/1996 | Murg | F41G 1/26 33/298 |
| 6,519,890 B1 | | 2/2003 | Otteman | |
| 7,676,137 B2 | * | 3/2010 | Schick | F41G 1/345 33/297 |
| 7,827,723 B1 | * | 11/2010 | Zaderey | F41G 1/38 42/122 |
| 8,928,878 B2 | * | 1/2015 | Jaeschke | G02B 27/36 33/298 |
| 2005/0254126 A1 | | 11/2005 | Lin et al. | |
| 2013/0167425 A1 | * | 7/2013 | Crispin | F41G 1/38 42/119 |

(Continued)

FOREIGN PATENT DOCUMENTS

GB    2162654 A  *  2/1986
WO    WO-2013102869 A1    7/2013

*Primary Examiner* — G. Bradley Bennett
(74) *Attorney, Agent, or Firm* — Locke Lord LLP; Daniel J. Fiorello; Scott D. Wofsy

(57) ABSTRACT

An adjustment dial assembly for a sealed system includes a knob having a flanged head and a body, wherein the body is dimensioned to extend through an opening in a housing wall, wherein the flanged head is dimensioned to interface with the housing wall. The body includes a seal detent disposed below of the flanged head for receiving a seal, a fastener interface disposed below the seal detent configured to interface with a fastener for retaining a movement regulation assembly and the knob to the housing wall, and a drive screw opening disposed within the body and configured to receive a drive screw such that the drive screw can be axially moved relative to the knob when the knob is rotated and the drive screw is rotationally fixed.

20 Claims, 5 Drawing Sheets

(56) References Cited

U.S. PATENT DOCUMENTS

2015/0135578 A1* 5/2015 Walker ................ F41G 1/38
  42/119
2017/0268851 A1* 9/2017 Hamilton ............. F41G 1/38
2017/0328674 A1* 11/2017 VanBecelaere ....... F41G 1/38

* cited by examiner

ADJUSTMENT DIAL ASSEMBLIES FOR SEALED SYSTEMS

BACKGROUND

1. Field

The present disclosure relates to adjustment dials, more specifically to adjustment dials for sealed systems.

2. Description of Related Art

Traditional optics (e.g., a Modular Digital Optical Gunsight (MDOG)) include sealed systems that have one or more adjustment dials (e.g., reticle adjustment mechanisms for windage and/or gravitational effect). Traditional adjustment dials are bulky and increase the size of the optical device because such mechanisms are required to provide a fixed and consistent degree of reticle movement per detent. Existing systems are large and protrusive from the optical assembly in order to provide the appropriate control.

Such conventional methods and systems have generally been considered satisfactory for their intended purpose. However, there is still a need in the art for improved adjustment dial assemblies for sealed systems. The present disclosure provides a solution for this need.

SUMMARY

An adjustment dial assembly for a sealed system includes a knob having a flanged head and a body, wherein the body is dimensioned to extend through an opening in a housing wall, wherein the flanged head is dimensioned to interface with the housing wall. The body includes a seal detent disposed below of the flanged head for receiving a seal, a fastener interface disposed below the seal detent configured to interface with a fastener for retaining a movement regulation assembly and the knob to the housing wall, and a drive screw opening disposed within the body and configured to receive a drive screw such that the drive screw can be axially moved relative to the knob when the knob is rotated and the drive screw is rotationally fixed.

The flanged head can be dimensioned to protrude from the housing wall. In certain embodiments, the flanged head can be dimensioned to be flush with the housing wall.

The flanged head include a tool detent for receiving a tool to rotate the knob relative to the housing wall. The flanged head can include a gripping surface to allow a user to rotate the knob with the user's fingers.

The assembly can further include the seal disposed at least partially in the seal detent, the seal configured to abut the housing wall to provide a fluid seal between the flanged head above the seal and the body below the seal. The seal can be dimensioned to fit within a thickness of the housing wall.

The assembly can further include a movement regulation assembly having a first ring having first knurls, the first ring fixed to the body of the knob above the fastener interface to rotate with the knob, and a second ring having second knurls that face and mesh with the first knurls in at least one position, the second ring including a larger inner diameter than an outer diameter of the body. The second ring can be configured to be rotationally fixed to the housing wall such that the interaction of the first knurls and the second knurls does not cause the second ring to rotate with the knob.

The body of the knob can include at least one knob body flat. The first ring can include a first ring flat configured to mate with the knob body flat to rotationally fix the first ring to the knob.

The assembly can further include the housing wall, wherein the movement regulation assembly further includes a spring disposed between the second ring and the housing wall to bias the second ring to compress against the first ring such that as the first knurls rotate with the knob, the first knurls interact with the second knurls to force the second ring upward against the bias of the spring until the first knurls and second knurls mesh again. The interaction of the first and second knurls can create discrete rotational positions for the knob when the first knurls and second knurls mesh.

In certain embodiments, the first knurls and/or the second knurls can include a sinusoidal pattern. Any other suitable shape or pattern for the first and/or second knurls is contemplated herein.

The housing wall can include a wall flat extending from an inner surface thereof. The second ring can include a second ring flat that mates with the wall flat to rotationally fix the second ring to the housing wall.

The assembly can further include the fastener disposed on the fastener interface of the body to hold the assembly together. In certain embodiments, the fastener can be a snap ring configured to clip around the fastener interface of the body to axially fix the first ring in a downward direction.

The assembly can further include the drive screw disposed within the knob, the drive screw configured to be rotationally fixed to a lens. The assembly can further include the lens.

In accordance with at least one aspect of this disclosure, an optical device can include an optic housing including a housing wall as described above, a lens disposed within the housing, and an adjustment dial assembly in accordance with any embodiments and/or combinations thereof as disclosed above.

In accordance with at least one aspect of this disclosure, a knob for an adjustment dial assembly for a sealed system can include a flanged head and a body as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
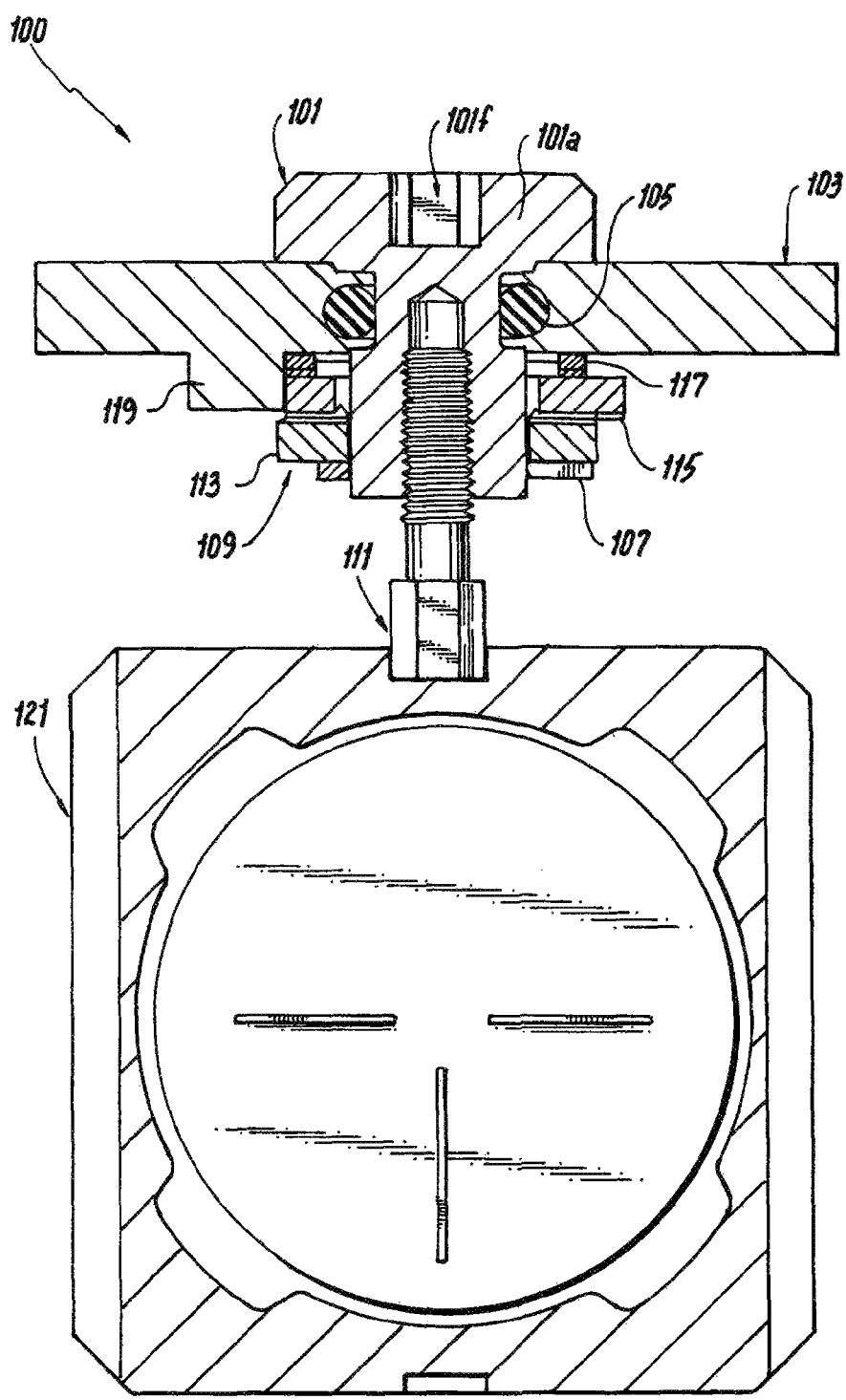
FIG. 1A is a cross-sectional view of an embodiment of an assembly in accordance with this disclosure, showing a flanged head of the knob protruding from the optical housing wall.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1A and is designated generally by reference character 100. Other embodiments and/or aspects of this disclosure are shown in FIGS. 1B-2C. The systems and methods described herein can be used to provide more compact and/or lighter weight adjustment dials (e.g., for optics).

Figure 1B:
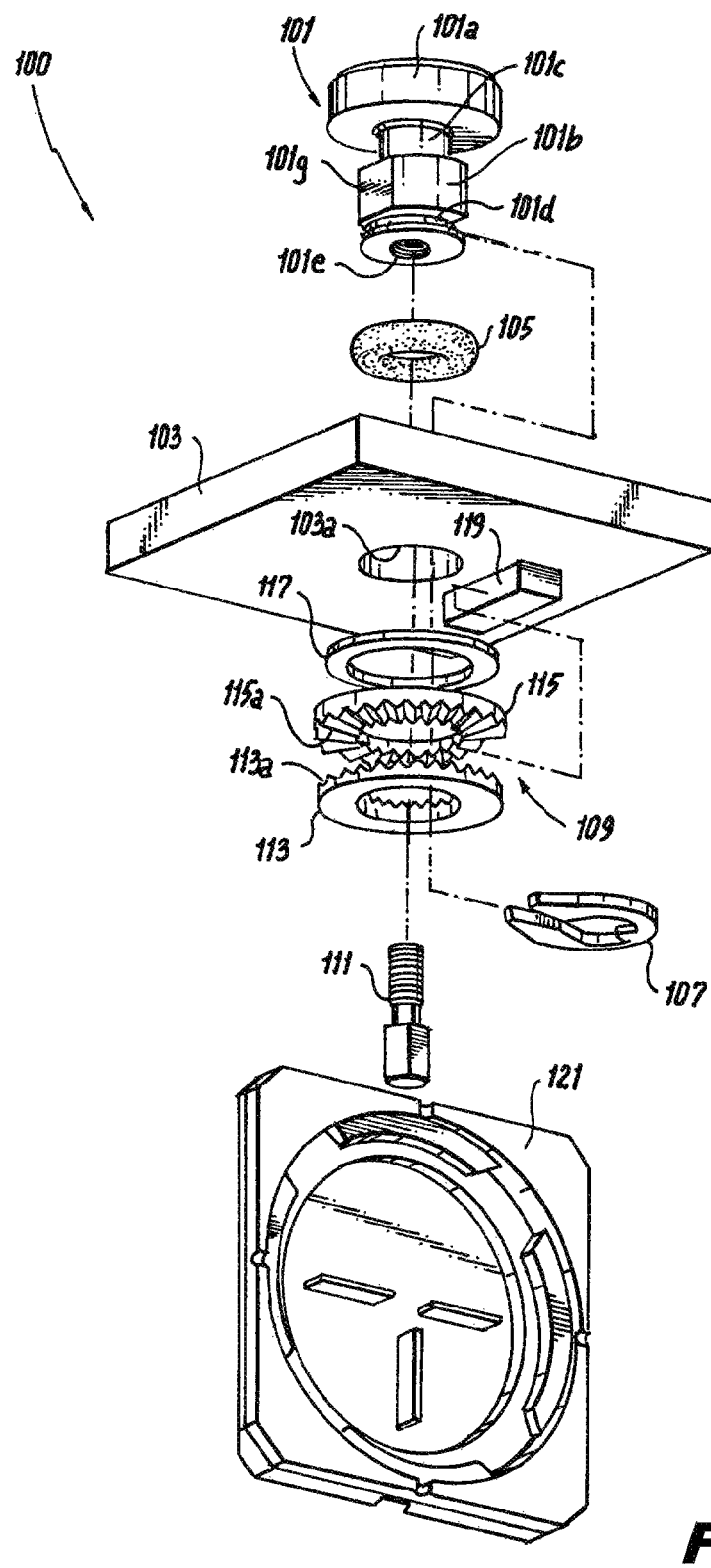
FIG. 1B is an exploded view of the embodiment of FIG. 1A.

Referring to FIGS. 1A and 1B, an adjustment dial assembly 100 for a sealed system includes a knob 101 having a flanged head 101a and a body 101b. The body 101b is dimensioned to extend through an opening 103a in a housing wall 103. The flanged head 101a is dimensioned to interface with the housing wall 103.

The body 101b includes a seal detent 101c disposed below of the flanged head 101a for receiving a seal 105. A fastener interface 101d is disposed below the seal detent 101c and is configured to interface with a fastener (e.g., clip ring 107) for retaining a movement regulation assembly 109 and the knob 101 to the housing wall 103.

The body 101b also includes a drive screw opening 101e disposed within the body 101b and configured to receive a drive screw 111 such that the drive screw 111 can be axially moved relative to the knob 101 when the knob 101 is rotated and the drive screw 111 is rotationally fixed (e.g., against a lens assembly).

Figure 2A:
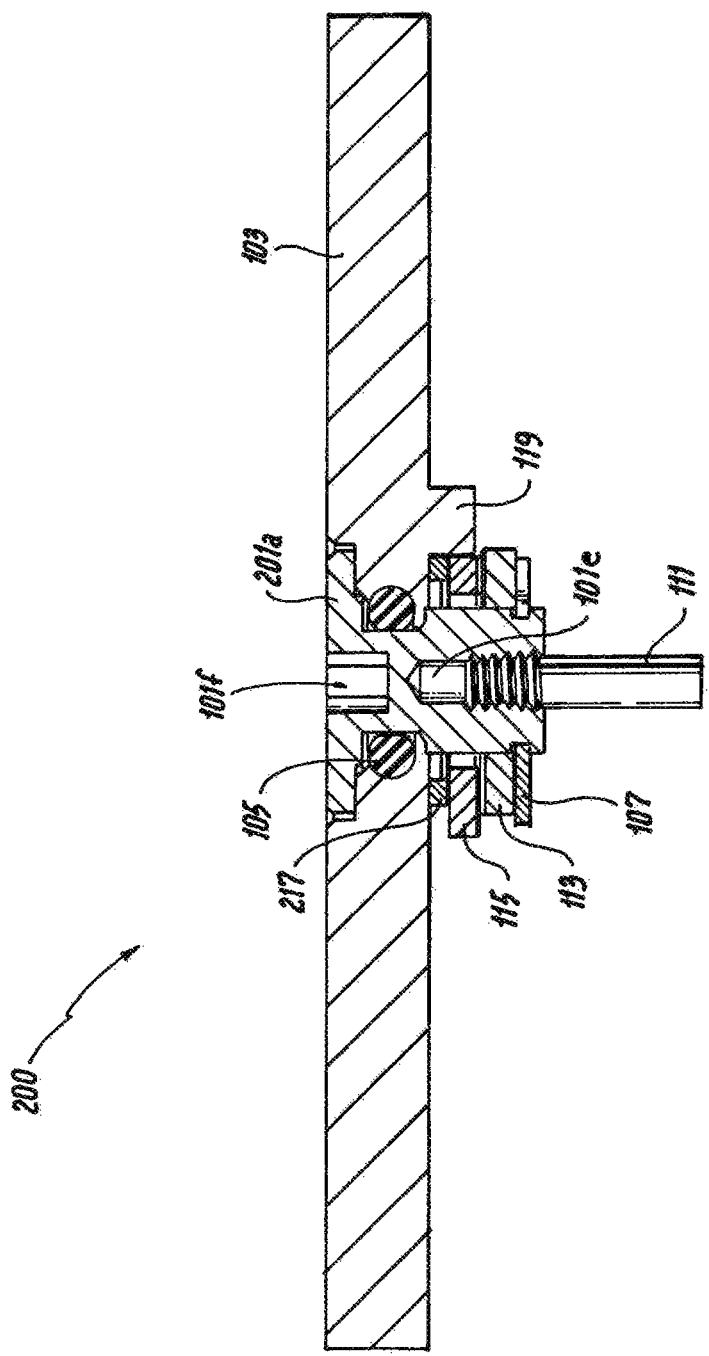
FIG. 2A is cross-sectional view of an embodiment of an assembly in accordance with this disclosure, shown having similar components as the embodiment of FIG. 1A except that the flanged head of the knob flush with the housing wall.
Figure 2B:
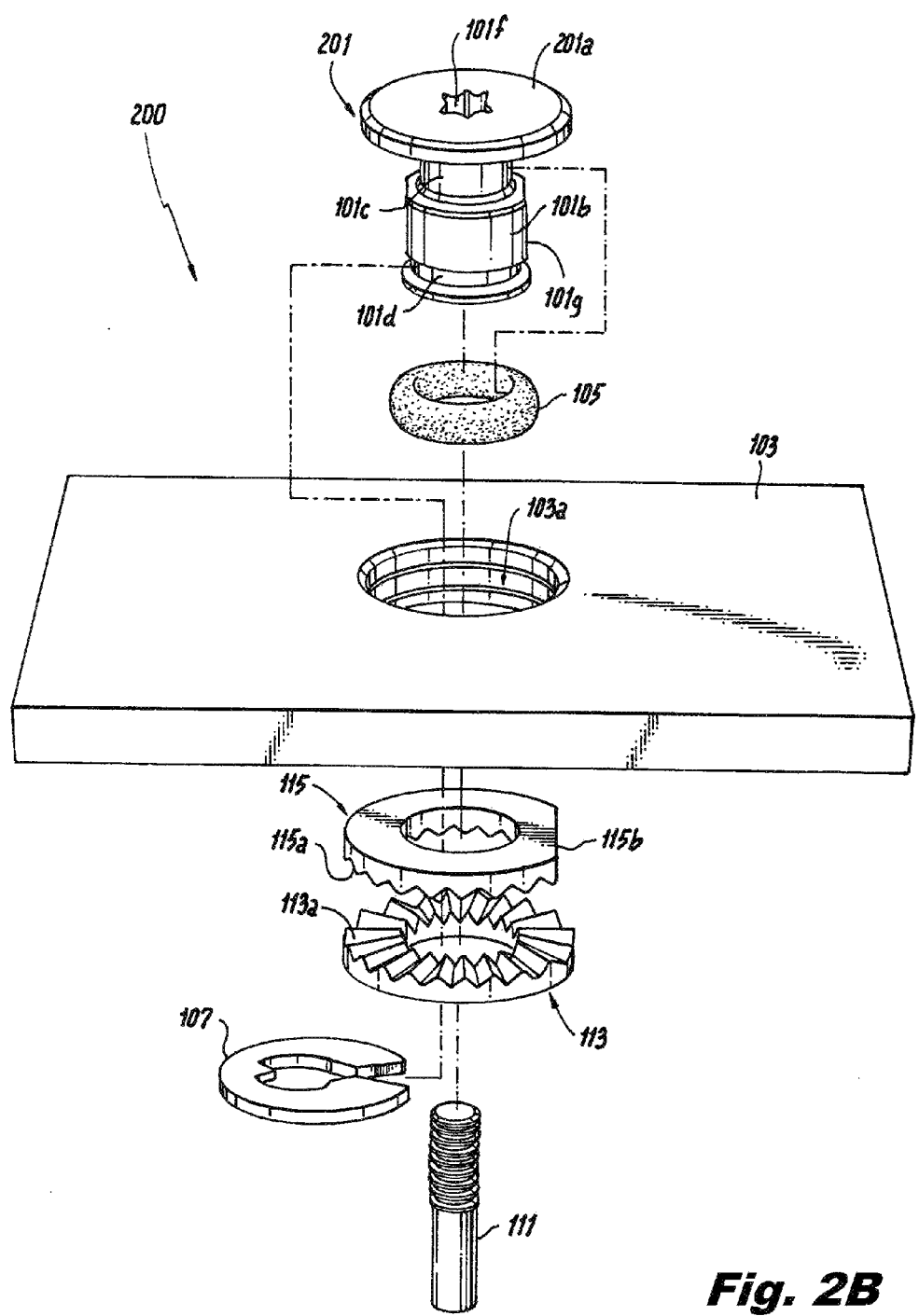
FIG. 2B is an exploded view of the embodiment of FIG. 2A.
Figure 2C:
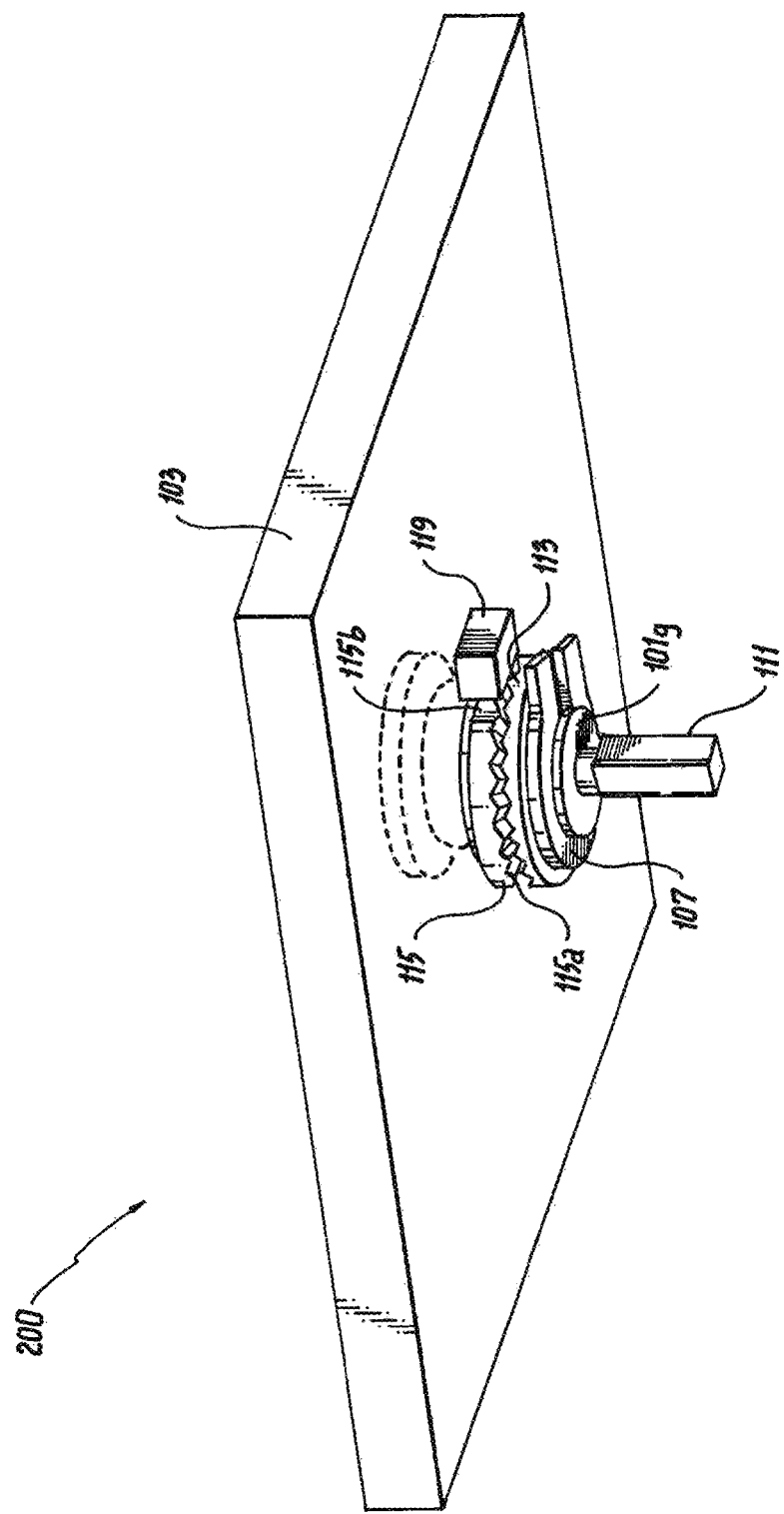
FIG. 2C is a perspective view of the embodiment of FIG. 2A from under the optical housing wall.

As shown in FIGS. 1A and 1B, the flanged head 101a can be dimensioned to protrude from the housing wall 103. In certain embodiments, as shown in FIGS. 2A, 2B, and 2C, an assembly 200 can have a knob 201 that includes a flanged head 201a that is dimensioned to be flush with the housing wall 103. As shown, assembly 200 otherwise includes similar features to assembly 100.

Referring generally to FIGS. 1A-2C, the flanged head 101a, 201a can include a tool detent 101f for receiving a tool to rotate the knob 101 relative to the housing wall 103. In certain embodiments, the flanged head 101a, 201a can include a gripping surface (e.g., on the protruding portion of flanged head 101a as shown in FIGS. 1A-1B) to allow a user to rotate the knob 101, 201 with the user's fingers.

The assembly 100, 200 can further include the seal 105 disposed at least partially in the seal detent 105. The seal 105 can be configured to abut the housing wall 103 to provide a fluid seal between the flanged head 101a, 201a above the seal 105 and the body 101b below the seal 105. In certain embodiments, as shown, the seal 105 can be dimensioned to fit within a thickness of the housing wall 103. The seal 105 is configured to allow the knob to be rotated while maintaining a seal.

Referring to FIGS. 1A and 1B, the assembly 100, 200 can further include the movement regulation assembly 109 which can include a first ring 113 having first knurls 113a. The first ring 113 can be fixed to the body 101b of the knob 101, 201 above the fastener interface 101d to rotate with the knob 101, 201. For example, as shown in FIG. 1A, the body 101b of the knob 101, 201 can include at least one knob body flat 101g. The first ring 113 can include a first ring flat 113b configured to mate with the knob body flat 101g to rotationally fix the first ring 113 to the knob 101, 201.

The movement regulation assembly 109 can further include a second ring 115 having second knurls 115a that face and mesh with the first knurls 113a in at least one position. The second ring 115 can include a larger inner diameter than an outer diameter of the body 101b so that the body 101b does not interfere directly with the second ring 115. The second ring 115 can be configured to be rotationally fixed to the housing wall 103 such that the interaction of the first knurls 113a and the second knurls 115a does not cause the second ring 115 to rotate with the knob 101, 201.

The assembly 100, 200 can further include the housing wall 103. The movement regulation assembly 109 can further include a spring 117 disposed between the second ring 115 and the housing wall 103 to bias the second ring 115 to compress against the first ring 113. In this regard, as the first knurls 113a rotate with the knob 101, 201, the first knurls 113a interact with the second knurls 115a to force the second ring 115 upward against the bias of the spring 117 until the first knurls 113a and second knurls 115a mesh again. The spring 117 can be any suitable spring (e.g., a wave spring).

As is appreciated by those skilled in the art in view of this disclosure, the interaction of the first knurls 113a and second knurls 115a can create discrete rotational positions (detents) for the knob 101, 201 when the first knurls 113a and second knurls 115a mesh. The tactility and/or sound created as a result of each turn can be controlled as a function of the shape and/or pattern of the knurls 113a, 115a. For example, in certain embodiments, the first knurls 113a and/or the second knurls 115a can include a sinusoidal pattern, which can create a smoother, less violent click between positions.

Any other suitable shape or pattern for the first and/or second knurls 113a, 115a is contemplated herein. For example, knurls 113a, 115b can be triangular (e.g., a v-pattern). As is appreciated by those skilled in the art in view of this disclosure, the sharper/higher amplitude of the knurls 113a, 115a, the louder and more violent each detent is.

Also, the amount of rotation required to advance the drive screw 111 a predetermined distance (e.g., that can translate to ¼" at 100 yards per click) can be controlled as a function of the period of the pattern of the knurls 113a, 115a and the threading pitch of the drive screw 111/drive screw opening 101e.

The housing wall 103 can include a wall flat 119 extending from an inner surface thereof. The second ring 115 can include a second ring flat 115b that mates with the wall flat to rotationally fix the second ring 115 to the housing wall 103. This configuration can allow the second ring 115 to move axially (away from and toward the first ring 113) and prevent rotation to allow the first ring 113 to rotate relative to the second ring 115.

The assembly 100, 200 can further include the fastener disposed on the fastener interface 101d of the body 101b to hold the assembly 100, 200 together. In certain embodiments, the fastener can be a snap ring 107 as shown which is configured to clip around the fastener interface 101d of the body 101b to axially fix the first ring 113 in a downward direction. This arrangement can sandwich the housing wall 103 between the components of the assembly 100, 200.

The assembly 100, 200 can further include the drive screw 111 disposed within the knob 101. The drive screw 111 can be configured to be rotationally fixed to a lens 121 (e.g., via at least one flat on an end of the drive screw 111 that mates with a flat in a housing of the lens 121). The assembly 100, 200 can further include the lens 121.

In accordance with at least one aspect of this disclosure, an optical device can include an optic housing including a housing wall 103 as described above, a lens 121 disposed within the housing, and an adjustment dial assembly 100, 200 in accordance with any embodiments and/or combinations thereof as disclosed above.

As described above, the drive screw 111 is driven by the user rotating the knob 101, 201. The drive screw 111 is unable to rotate and is therefore extended or retracted from the knob 101, 201 by virtue of its threaded relationship with the drive screw opening 101*e* of the knob 101, 201. The drive screw 111 in turn drives the position of the lens 121 (e.g., a reticle for a gun sight). Also, since rotation is the only degree of freedom for the knob 101, 201, the seal 105 can provide sealing for the housing wall 103, preventing fluids into the sealed environment where the lens 121 is disposed. One or more flats 101*g* on the knob 101, 201 can rotationally lock to one or more flats 113*b* on the first ring 113. One or more flats 115*b* can lock it rotationally to the housing wall 103, but does not prevent rotation of the knob 101, 201.

Thus the first ring 113 and the second ring 115 (which can both have identical circumferentially disposed sinusoidal surfaces at their interface, for example) rotate with respect to one another when the knob 101, 201 is turned. This causes the second ring 115 to overcome the spring force applied by the spring 117, and to ride over the peaks (e.g., sinusoidal) of the knurls 113*a*, 115*a*, until the knurls 113*a*, 115*a* mesh again (e.g., peak to trough), thereby providing discrete detents.

Traditional reticle mechanisms rely on a ball and spring plunger which acts radially against a knurled surface to provide detent. Whether this surface is an inner or outer diameter, a relatively large spring plunger is required to generate sufficient force against the knurls. The diameter and length of the spring plunger drives the size of the assembly in such designs. Embodiments of this disclosure can use a much smaller spring 117 (e.g., a wave spring), which provides much greater detent force in a smaller space.

Embodiments can provide a fixed and consistent degree of reticle movement per detent while being low profile, sealed, and requiring no external features on the sight housing beyond a round thru hole. At least some embodiments can have wide applications beyond reticle adjustment and could be configured for use in any situation requiring adjustment dials. For example, at least some embodiments could be adapted to provide mechanical feedback for any type of mechanical or electronic knob/dial that needs to penetrate a sealed system, especially where space is limited.

The methods and systems of the present disclosure, as described above and shown in the drawings, provide for adjustment dial assemblies with superior properties including reduced size and/or weight. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An adjustment dial assembly for a sealed system, comprising:
    a knob including a flanged head and a body, wherein the body is dimensioned to extend through an opening in a housing wall, wherein the flanged head is dimensioned to interface with the housing wall, wherein the body includes:
        a seal detent disposed below of the flanged head for receiving a seal;
        a fastener interface disposed below the seal detent configured to interface with a fastener for retaining a movement regulation assembly and the knob to the housing wall; and
        a drive screw opening disposed within the body and configured to receive a drive screw such that the drive screw can be axially moved relative to the knob when the knob is rotated and the drive screw is rotationally fixed.

2. The assembly of claim 1, wherein the flanged head is dimensioned to protrude from the housing wall.

3. The assembly of claim 1, wherein the flanged head is dimensioned to be flush with the housing wall.

4. The assembly of claim 1, wherein the flanged head includes a tool detent for receiving a tool to rotate the knob relative to the housing wall.

5. The assembly of claim 1, wherein the flanged head includes a gripping surface to allow a user to rotate the knob with the user's fingers.

6. The assembly of claim 1, further comprising the seal disposed at least partially in the seal detent, the seal configured to abut the housing wall to provide a fluid seal between the flanged head above the seal and the body below the seal.

7. The assembly of claim 6, wherein the seal is dimensioned to fit within a thickness of the housing wall.

8. The assembly of claim 1, further comprising the movement regulation assembly, wherein the movement regulation assembly includes:
    a first ring having first knurls, the first ring fixed to the body of the knob above the fastener interface to rotate with the knob; and
    a second ring having second knurls that face and mesh with the first knurls in at least one position, the second ring including a larger inner diameter than an outer diameter of the body, and wherein the second ring is configured to be rotationally fixed to the housing wall such that the interaction of the first knurls and the second knurls does not cause the second ring to rotate with the knob.

9. The assembly of claim 8, wherein the body of the knob includes at least one knob body flat, wherein the first ring includes a first ring flat configured to mate with the knob body flat to rotationally fix the first ring to the knob.

10. The assembly of claim 8, further comprising the housing wall, wherein the movement regulation assembly further includes a spring disposed between the second ring and the housing wall to bias the second ring to compress against the first ring such that as the first knurls rotate with the knob, the first knurls interact with the second knurls to force the second ring upward against the bias of the spring until the first knurls and second knurls mesh again, wherein the interaction of the first and second knurls creates discrete rotational positions for the knob when the first knurls and second knurls mesh.

11. The assembly of claim 10, wherein the first knurls and/or the second knurls include a sinusoidal pattern.

12. The assembly of claim 8, wherein the housing wall includes a wall flat extending from an inner surface thereof, wherein the second ring includes a second ring flat that mates with the wall flat to rotationally fix the second ring to the housing wall.

13. The assembly of claim 10, further comprising the fastener disposed on the fastener interface of the body to hold the assembly together.

14. The assembly of claim 13, wherein the fastener is a snap ring configured to clip around the fastener interface of the body to axially fix the first ring in a downward direction.

15. The assembly of claim 10, further comprising the drive screw disposed within the knob, the drive screw configured to be rotationally fixed to a lens.

16. The assembly of claim 15, further comprising the lens.

17. An optical device, comprising:
    an optic housing including a housing wall;
    a lens disposed within the housing; and
    an adjustment dial assembly, comprising:

a knob including a flanged head and a body, wherein the body is dimensioned to extend through an opening in the housing wall, wherein the flanged head is dimensioned to interface with the housing wall, wherein the body includes:
   a seal detent disposed below of the flanged head for receiving a seal;
   a fastener interface disposed below the seal detent configured to interface with a fastener for retaining a movement regulation assembly and the knob to the housing wall; and
   a drive screw opening disposed within the body and configured to receive a drive screw such that the drive screw can be axially moved relative to the knob when the knob is rotated and the drive screw is rotationally fixed;
the seal disposed at least partially in the seal detent, the seal configured to abut the housing wall to provide a fluid seal between the flanged head above the seal and the body below the seal;
a movement regulation assembly, wherein the movement regulation assembly includes:
   a first ring having first knurls, the first ring fixed to the body of the knob above the fastener interface to rotate with the knob; and
   a second ring having second knurls that face and mesh with the first knurls in at least one position, the second ring including a larger inner diameter than an outer diameter of the body, and wherein the second ring is configured to be rotationally fixed to the housing wall such that the interaction of the first knurls and the second knurls does not cause the second ring to rotate with the knob, wherein the housing wall includes a wall flat extending from an inner surface thereof, wherein the second ring includes a second ring flat that mates with the wall flat to rotationally fix the second ring to the housing wall;
the fastener disposed on the fastener interface of the body to hold the assembly together; and
the drive screw disposed within the knob, the drive screw rotationally fixed to a lens.

18. The optical device of claim 17, wherein the flanged head is dimensioned to protrude from the housing wall.

19. The optical device of claim 17, wherein the flanged head is dimensioned to be flush with the housing wall.

20. A knob for an adjustment dial assembly for a sealed system, comprising:
   a flanged head;
   a body, wherein the body is dimensioned to extend through an opening in a housing wall, wherein the flanged head is dimensioned to interface with the housing wall, wherein the body includes:
      a seal detent disposed below of the flanged head for receiving a seal;
      a fastener interface disposed below the seal detent configured to interface with a fastener for retaining a movement regulation assembly and the knob to the housing wall; and
      a drive screw opening disposed within the body and configured to receive a drive screw such that the drive screw can be axially moved relative to the knob when the knob is rotated and the drive screw is rotationally fixed.

\* \* \* \* \*